United States Patent [19]

Nanjyo

[11] Patent Number: 5,161,300
[45] Date of Patent: Nov. 10, 1992

[54] METHOD FOR MANUFACTURE OF MAGNETIC HEAD

[75] Inventor: Shinichi Nanjyo, Miyagi, Japan
[73] Assignee: Sony Corporation, Tokyo, Japan
[21] Appl. No.: 656,196
[22] Filed: Feb. 15, 1991

[30] Foreign Application Priority Data

Feb. 17, 1990 [JP] Japan .................. 2-37009

[51] Int. Cl.$^5$ .................. G11B 5/127; H01F 7/06
[52] U.S. Cl. .................. 29/603; 156/89; 156/268; 156/325
[58] Field of Search .................. 156/89, 268, 325; 29/603

[56] References Cited

U.S. PATENT DOCUMENTS 5,016,341 5/1991 Ogawa et al. .................. 29/603

FOREIGN PATENT DOCUMENTS 0405900 1/1991 European Pat. Off. .
60-52911 3/1985 Japan .
60-147913 8/1985 Japan .
61-134910 6/1986 Japan .
61-196413 8/1986 Japan .
1081715 10/1990 Japan .

Primary Examiner—James Lowe
Assistant Examiner—Christopher A. Fiorilla
Attorney, Agent, or Firm—Hill, Van Santen, Steadman & Simpson

[57] ABSTRACT

A method for manufacture of a bulk-type magnetic head capable of performing a frame recording operation. In sequential steps, coil grooves and track-width limit grooves substantially orthogonal thereto are formed in respective butt surfaces of a pair of magnetic core blocks, and then head-element division slits are formed between the track-width limit grooves. Subsequently the magnetic core blocks are joined to be integral with each other, and notches are formed in the core blocks in such a manner as to extend from lateral surfaces of the core blocks on the reverse side with respect to the butt surfaces thereof and to reach at least the coil grooves adjacently to the head-element division slits, whereby the in-line precision of magnetic gaps can be enhanced and high productivity is attained in manufacture of the magnetic head.

1 Claim, 12 Drawing Sheets ced therebetween, so that a sufficient space is existent for winding coils with a superior coil winding performance, and crosstalk characteristics can also be improved.

METHOD FOR MANUFACTURE OF MAGNETIC HEAD

BACKGROUND OF THE INVENTION

1. Field of the Invention

The present invention relates to a method for manufacture of a magnetic head adapted to perform a frame recording operation in an electronic still camera or the like.

2. Description of the Prior Art

In the conventional magnetic head designed for use in an electronic still camera or the like to record frames of still images on a video floppy disk, the track-to-track interval is as small as 40 microns or so for attaining a high recording density, so that the requisite for precision is rendered extremely strict. For the magnetic head having a frame recording capability, it has been customary heretofore to employ a thin film type where magnetic gaps are arrayed in a straight line on one substrate. Since two channels in such thin-film type magnetic head are formed simultaneously on a single substrate by the thin-film forming technique, there is achievable an advantage that a satisfactory in-line accuracy can be ensured between the two-channel gaps and the electromagnetic characteristics thereof are rendered uniform. Accordingly no phase deviation occurs between the magnetic gaps, and any loss derived from the phase deviation of recorded and reproduced signals can be eliminated. Furthermore, due to the application of high-precision thin film forming technique, the dimensional precision is retained to be high, and a narrow track interval can be realized.

However, in such conventional thin-film type magnetic head, there exist some drawbacks including that the production cost is raised because of the high-precision thin film forming process, and the steps thereof are complicated to consequently bring about an additional increase in the cost.

In an attempt to solve the above problems, there may be adopted the use of a bulk-type magnetic head which is producible at a lower cost. This type, however, has a difficulty in arraying the magnetic gaps of individual head elements in a straight line with a high precision to consequently raise the problems of in-line error and phase deviation. Furthermore, it is necessary in the bulk-type magnetic head to wind coils therein to eventually induce a problem relative to the coil winding space, hence failing in development of a narrow track structure.

With regard to the conventional magnetic heads contrived for solving the above problems, there is known one example as disclosed in Japanese Patent Laid-open No. Sho 63 (1988)-231711.

In the above exemplary magnetic head, track-width limit grooves are formed in one magnetic core half or block to shape two magnetic-gap forming surfaces on a single plane, and the other magnetic core halves prepared individually with coil grooves formed therein are joined to each other in such a manner that the respective magnetic-gap forming surfaces are mutually connected, thereby producing a two-channel magnetic head.

In the magnetic head thus produced, the magnetic gaps are formed on a single plane, so that the in-line precision of the gaps can be enhanced. And since the mutually confronting portions of the other magnetic core halves with coil grooves formed therein are inclined in the direction to recede from each other, a wide interval can be obtained between the mutually confronting magnetic core halves to consequently ensure a sufficient space required for winding coils in the grooves.

However, in the above known magnetic head where the magnetic core halves on one side are joined to each other, there is a disadvantage with respect to its crosstalk characteristics. In addition, although a sufficient space can be ensured for winding coils, the coil grooves are existent in the same direction and therefore the coil winding operation is somewhat intricate with difficulty.

OBJECT AND SUMMARY OF THE INVENTION

The present invention has been accomplished in view of the problems mentioned. And its object is to provide an improved magnetic head manufacturing method which is adapted for enhancing the in-line precision of magnetic gaps and realizing a narrow track structure while ensuring a sufficient coil-winding space with further advantages of superior crosstalk characteristics and lower production cost.

According to one aspect of the present invention, there is provided an improved magnetic head manufacturing method which comprises the steps of: forming, in respective butt surfaces of a pair of magnetic core blocks, coil grooves and auxiliary core block fitting grooves substantially orthogonal thereto; fitting auxiliary core blocks, which constitute one magnetic core of a magnetic head element, into the auxiliary core block fitting grooves and then welding the auxiliary core blocks therein with glass; forming track-width limit grooves in the respective butt surfaces of the magnetic core blocks substantially orthogonally to the coil grooves, and forming head-element division slits between the track-width limit grooves; butting the magnetic core blocks to each other with positional alignment of tracks, and then welding the core blocks to each other with glass; forming notches in the core blocks along the direction of extension of the track-width limit grooves in such a manner as to extend from lateral surfaces of the core blocks on the reverse side with respect to the butt surfaces thereof and to reach at least the coil grooves adjacently to the head-element division slits; and cutting the above structure at the positions of the notches to thereby divide the same into individual magnetic heads.

In the present invention, coil grooves and track-width limit grooves substantially orthogonal thereto are formed in respective butt surfaces of magnetic core blocks, and after head-element division slits are formed between the track-width limit grooves, the magnetic core blocks are welded to each other with glass. And subsequently notches are formed in the core blocks in such a manner as to extend from lateral surfaces of the core blocks on the reverse side with respect to the butt surfaces thereof and to reach at least the coil grooves adjacently to the head-element division slits. Therefore, when the above structure is severed at the positions corresponding to the notches, it is divided into individual magnetic heads each consisting of a pair of head elements which are mutually joined with the glass filled into the head-element division slits.

Since the magnetic gaps are formed on the same plane in each of the magnetic heads thus obtained, a high in-line precision is attained in the magnetic gaps. Furthermore, the coil grooves are disposed on the mutually reverse sides with the magnetic gaps positioned therebetween, and the core thickness of the individual magnetic head elements opposed to the coil grooves are rendered smaller than the depth of the coil grooves, hence ensuring a sufficient space for winding coils in the grooves. Moreover, the in-line precision of the magnetic gaps can be ensured and high productivity is attained in manufacture of the magnetic head.

The above and other features and advantages of the present invention will become apparent from the following description which will be given with reference to the illustrative accompanying drawings.

BRIEF DESCRIPTION OF THE DRAWINGS

FIGS. 1 through 11 illustrate sequential steps in the process of manufacturing a magnetic head by applying the method of the present invention, in which:

FIG. 1 is an enlarged partial perspective view of a pair of magnetic core blocks;

FIG. 2 is an enlarged partial perspective view showing a step of forming coil grooves and auxiliary core block fitting grooves;

FIG. 3 (a) is an enlarged perspective view of an exemplary auxiliary core block;

FIG. 3 (b) is an enlarged perspective view of another exemplary auxiliary core block;

FIG. 4 is an enlarged partial perspective view showing a step of welding auxiliary core blocks with glass;

FIG. 5 is an enlarged partial perspective view showing a step of forming track-width limit grooves and head-element division slits;

FIG. 6 is an enlarged partial perspective view showing a step of joining magnetic core blocks to each other;

FIG. 7 is an enlarged partial perspective view showing a step of mutually welding the magnetic core blocks with glass;

FIG. 8 is an enlarged partial perspective view showing a step of forming notches in one core block;

FIG. 9 is an enlarged partial perspective view showing a step of forming notches in the other core block;

FIG. 10 is an enlarged partial perspective view showing a step of dividing magnetic head elements;

FIG. 11 is an enlarged perspective view showing a step of winding coils;

DESCRIPTION OF THE PREFERRED EMBODIMENT

Hereinafter an exemplary embodiment for implementing the magnetic head manufacturing method of the present invention will be described with reference to the accompanying drawings.

Figure 1:
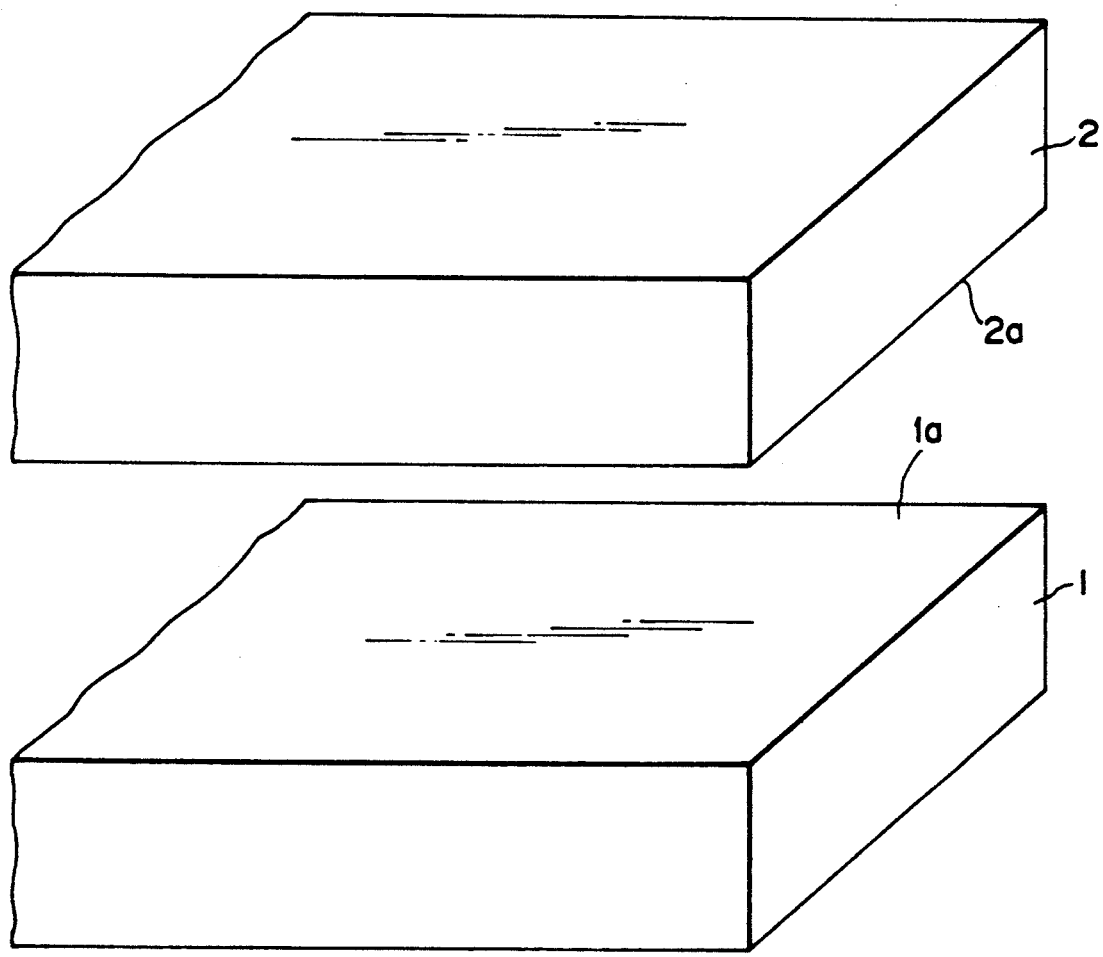

In manufacture of a magnetic head according to this embodiment, there are initially prepared, as shown in FIG. 1, a pair of plate-shaped magnetic core blocks 1, 2 which are composed of oxide material such as Mn-Zn ferrite or Ni-Zn ferrite.

Figure 2:
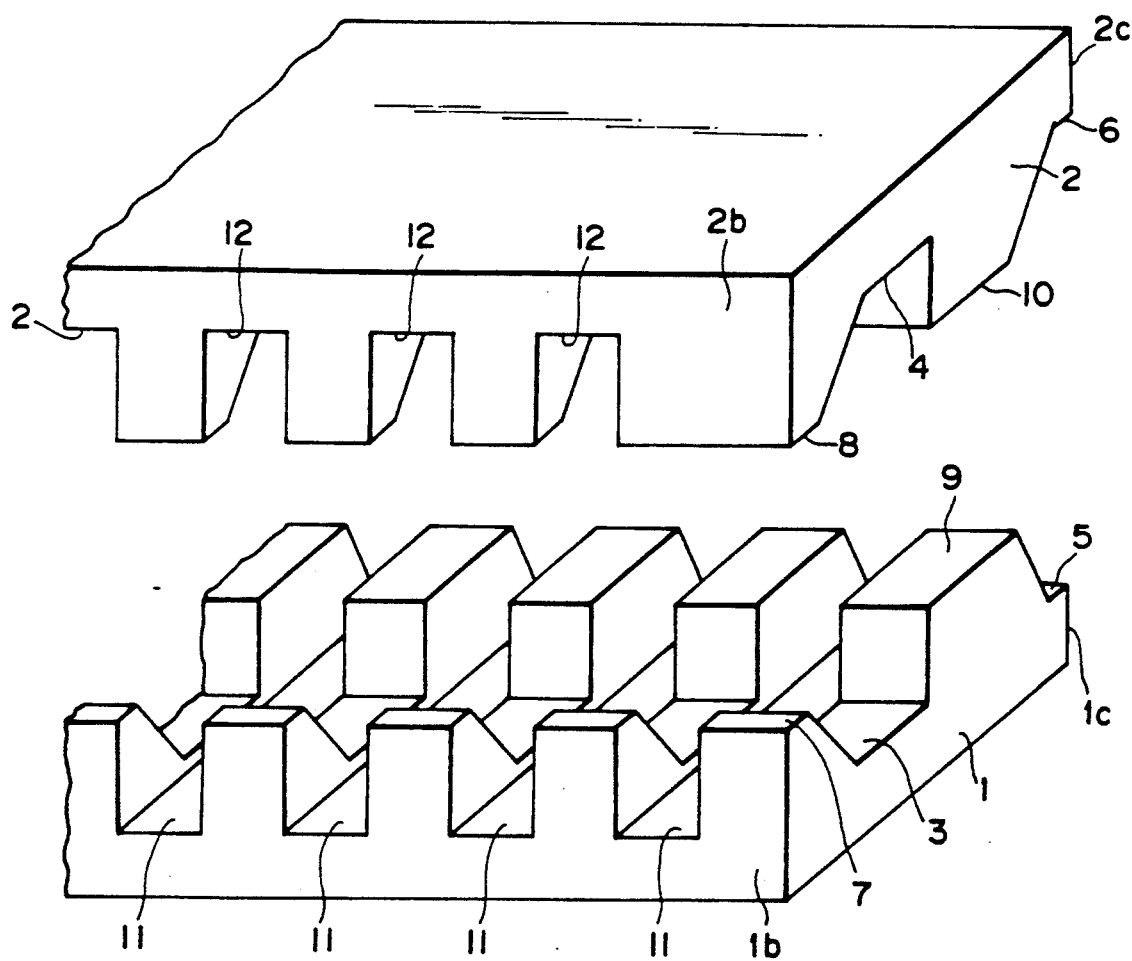

Then, as illustrated in FIG. 2, coil grooves 3, 4 for limiting the depth of undermentioned magnetic gaps and glass grooves 5, 6 for ensuring a required joint strength of the magnetic core blocks 1, 2 are formed in respective butt surfaces 1a, 2a of the core blocks 1, 2 transversely to tracks over the entire blocks.

In this stage, the coil grooves 3, 4 are so formed that the cross-sectional shape thereof becomes rectangular in the vicinities of recording-medium slide surfaces 1b, 2b which are longitudinal lateral surfaces of the magnetic core blocks 1, 2. Meanwhile the glass grooves 5, 6 are formed in the vicinities of the other lateral surfaces 1c, 2c, which are on the reverse side with respect to the recording-medium slide surfaces 1b, 2b, by obliquely cutting off portions of the lateral surfaces 1c, 2c.

As a result, flat portions defined between the recording-medium slide surfaces 1b, 2b and the coil grooves 3, 4 become front-gap forming surfaces 7, 8; while flat portions defined between the coil grooves 3, 4 and the glass grooves 5, 6 become back-gap forming surfaces 9, 10.

Subsequently, a plurality of auxiliary core block fitting grooves 11, 12 are formed in the depth direction of magnetic gaps over the entire blocks substantially orthogonally to the coil grooves 3, 4 in a manner to retain predetermined intervals transversely to the tracks.

In this step, the auxiliary core block fitting grooves 11, 12 are formed alternately in the core blocks 1, 2 to be straight and rectangular in cross section and to be deeper than the coil grooves 3, 4.

Figure 3A:
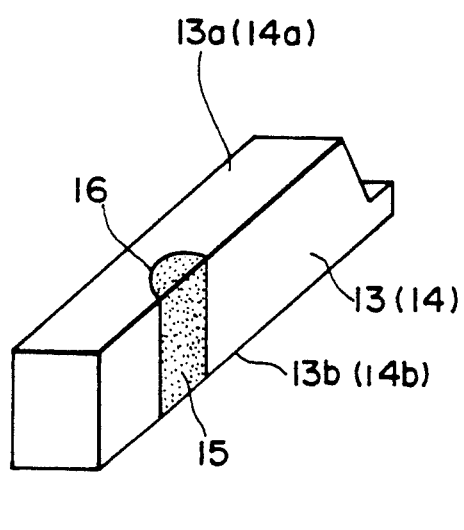
Figure 3B:
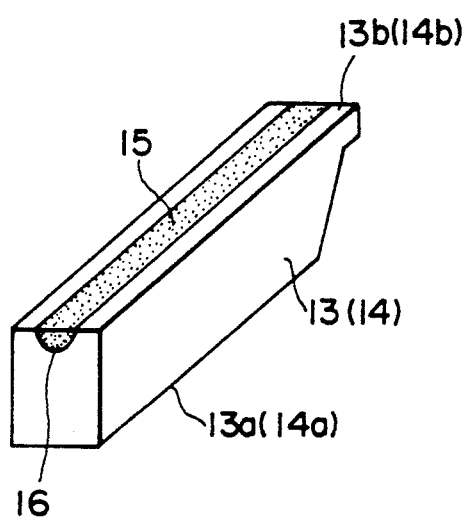

Next, auxiliary core blocks 13, 14 to be fitted into the grooves 11, 12 are formed as illustrated in FIG. 3 (a).

The auxiliary core blocks 13, 14 serve as one magnetic core of an undermentioned magnetic head element and are formed in conformity with the shape of the auxiliary core block fitting grooves 11, 12 in such a manner as to completely close the grooves 11, 12 when fitted therein. In such closed state, principal planes 13a, 14a of the auxiliary core blocks 13, 14 become flush with both the front-gap forming surfaces 7, 8 and the back-gap forming surfaces 9, 10 of the magnetic core blocks 1, 2.

Since the auxiliary core blocks 13, 14 need to be joined to the magnetic core blocks 1, 2, notches 16 to be filled with glass 15 of a high melting point are formed to be arcuate in cross section orthogonally to the coil grooves 3, 4 by partially cutting off the lateral surfaces 13b, 14b of the auxiliary core blocks 13, 14 at positions corresponding to the coil grooves 3, 4. In a modification, the cross-sectionally arcuate notches 16 may be formed in the planes 13b, 14b, which are to be in contact with the bottom surface of the auxiliary core block fitting grooves 11, 12, in a manner to extend over the entire blocks along the depth direction of the magnetic gaps, as illustrated in FIG. 3 (b).

Thereafter the auxiliary core blocks 13, 14 are fitted into and welded with glass to the auxiliary core block fitting grooves 11, 12.

Figure 4:
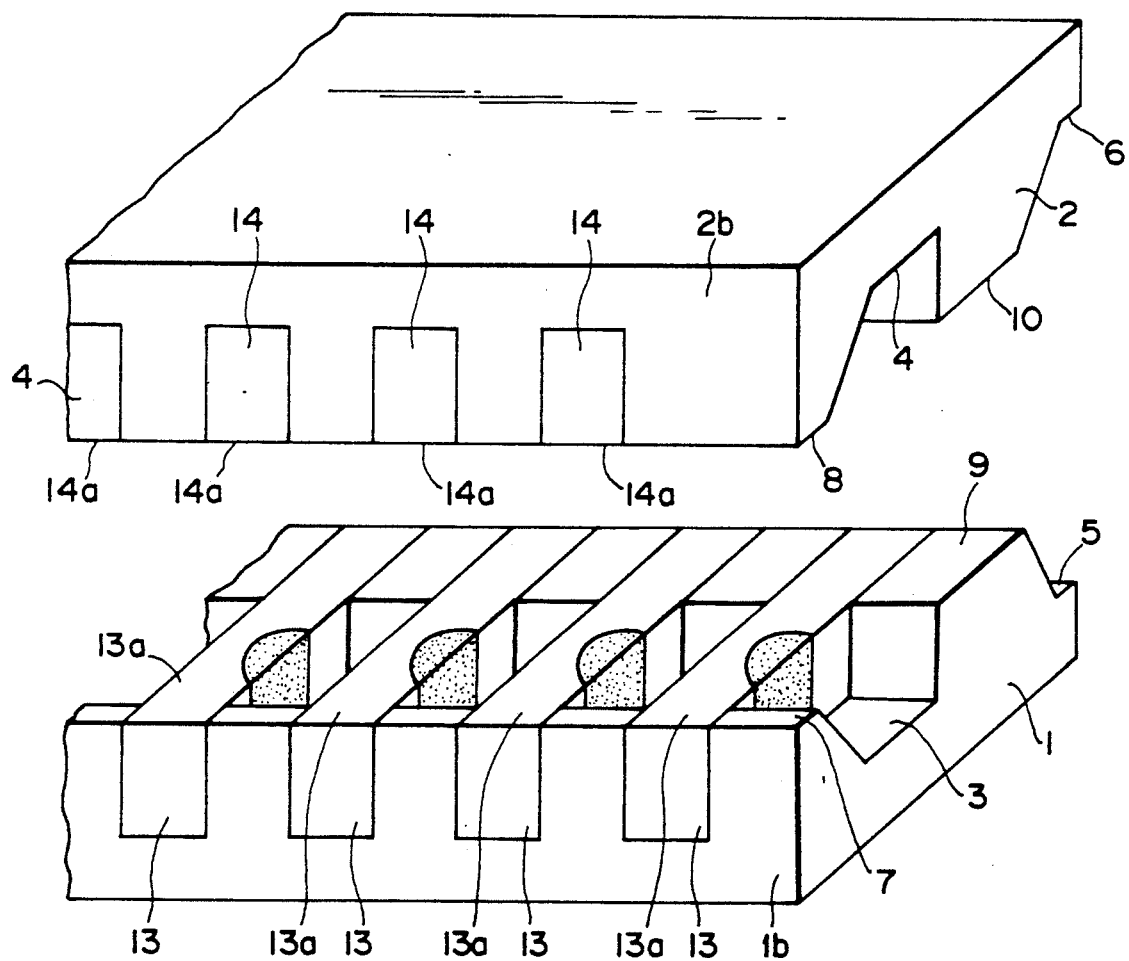

As a result, the grooves 11, 12 are closed with the auxiliary core blocks 13, 14 as illustrated in FIG. 4, so that the principal planes 13a, 14a of the auxiliary core blocks 13, 14 become flush with both the front-gap forming surfaces 7, 8 and the back-gap forming surfaces 9, 10.

When the principal planes 13a, 14a of the auxiliary core blocks 13, 14 have any level difference from the front-gap forming surfaces 7, 8 or the back-gap forming surfaces 9, 10 due to the welding with glass, the whole surfaces are polished to be flush with each other.

Figure 5:
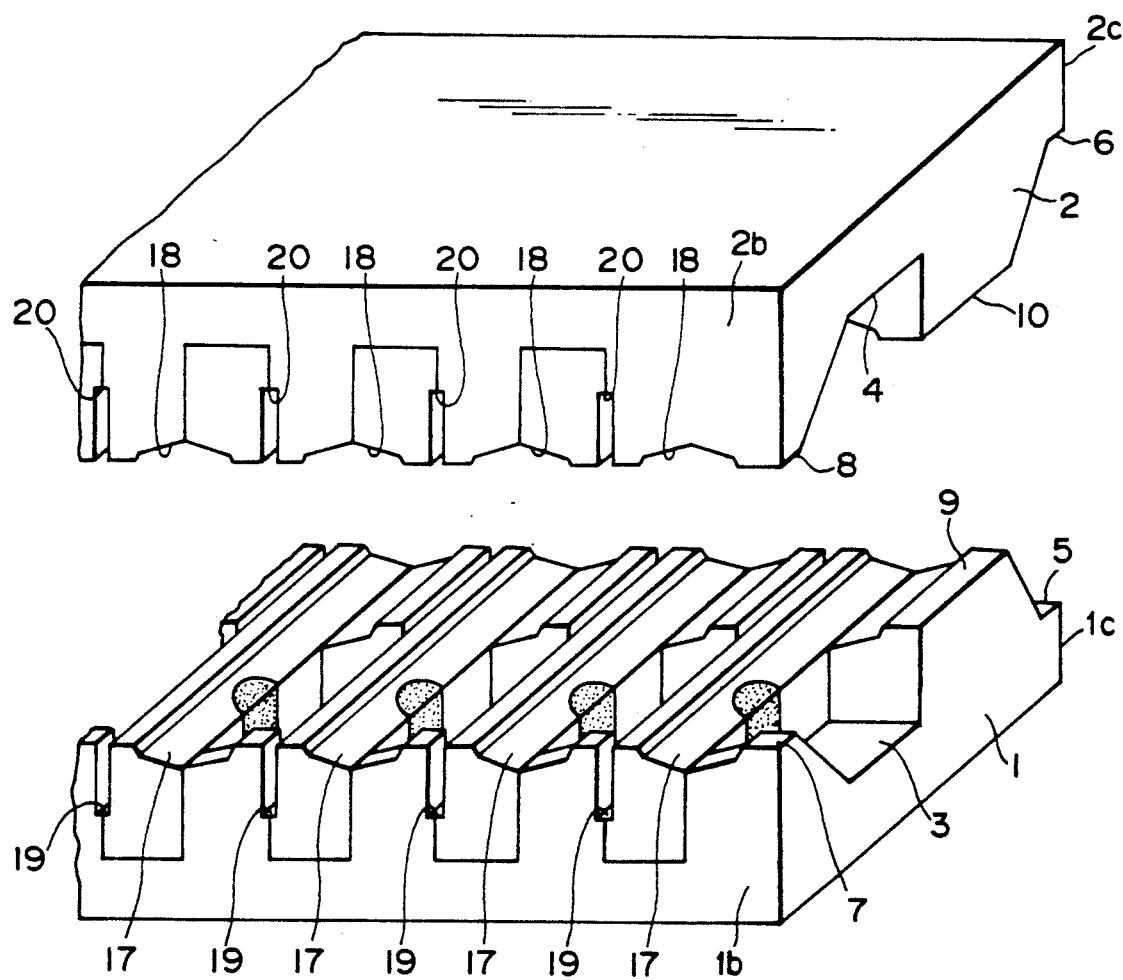

Subsequently, a plurality of track-width limit grooves 17, 18 are formed in the respective butt surfaces 1a, 2a of the magnetic core blocks 1, 2 substantially orthogonally to the coil grooves 3, 4 as illustrated in FIG. 5 in a manner to extend over the entire blocks in the depth direction of the magnetic gaps while retaining predetermined intervals transversely to the tracks.

In this embodiment, the track-width limit grooves 17, 18 are provided opposite respectively to the magnetic core blocks 1, 2 and are so formed that the cross-sectional shape thereof becomes V substantially. And the two side walls proximate to the butt surfaces 1a, 2a are inclined to widen the grooves proximate to the butt surfaces 1a, 2a. The shape of the track-width limit grooves 17, 18 is not restricted to the above example alone, and it may be substantially arcuate in cross section.

Thereafter head-element division slits 19, 20 are formed between adjacent track-width limit grooves 17, 18 so as to divide undermentioned magnetic head elements and also to limit the track width of the magnetic gap in combination with the grooves 17, 18.

More specifically, as illustrated in FIG. 5, head-element division slits 19, 20 having a rectangular cross section shallower than the coil grooves 3, 4 are formed astride the magnetic core blocks 1, 2 and the auxiliary core blocks 13, 14 in a manner to extend over the entire blocks in the depth direction of the magnetic gaps.

Since the width of the head-element division slits 19, 20 corresponds to the track-to-track interval in the pair of mutually adjacent magnetic head elements, the operation of cutting the head-element division slits 19, 20 is performed by the use of a grinder or the like which dimensionally conforms with the preset track-to-track interval. If necessary, the head-element division slits 19, 20 may be formed further deeper than the coil grooves 3, 4.

Consequently, the front-gap forming surfaces 7, 8 between the adjacent track-width limit grooves 17, 18 are divided into two by the head-element division slits 19, 20. The width of each of the halved front-gap forming surfaces 7, 8, i.e., the width interposed between the head-element division slits 19, 20 and the track-width limit grooves 17, 18 formed on both sides thereof, corresponds to the track width of each magnetic gap.

Figure 6:
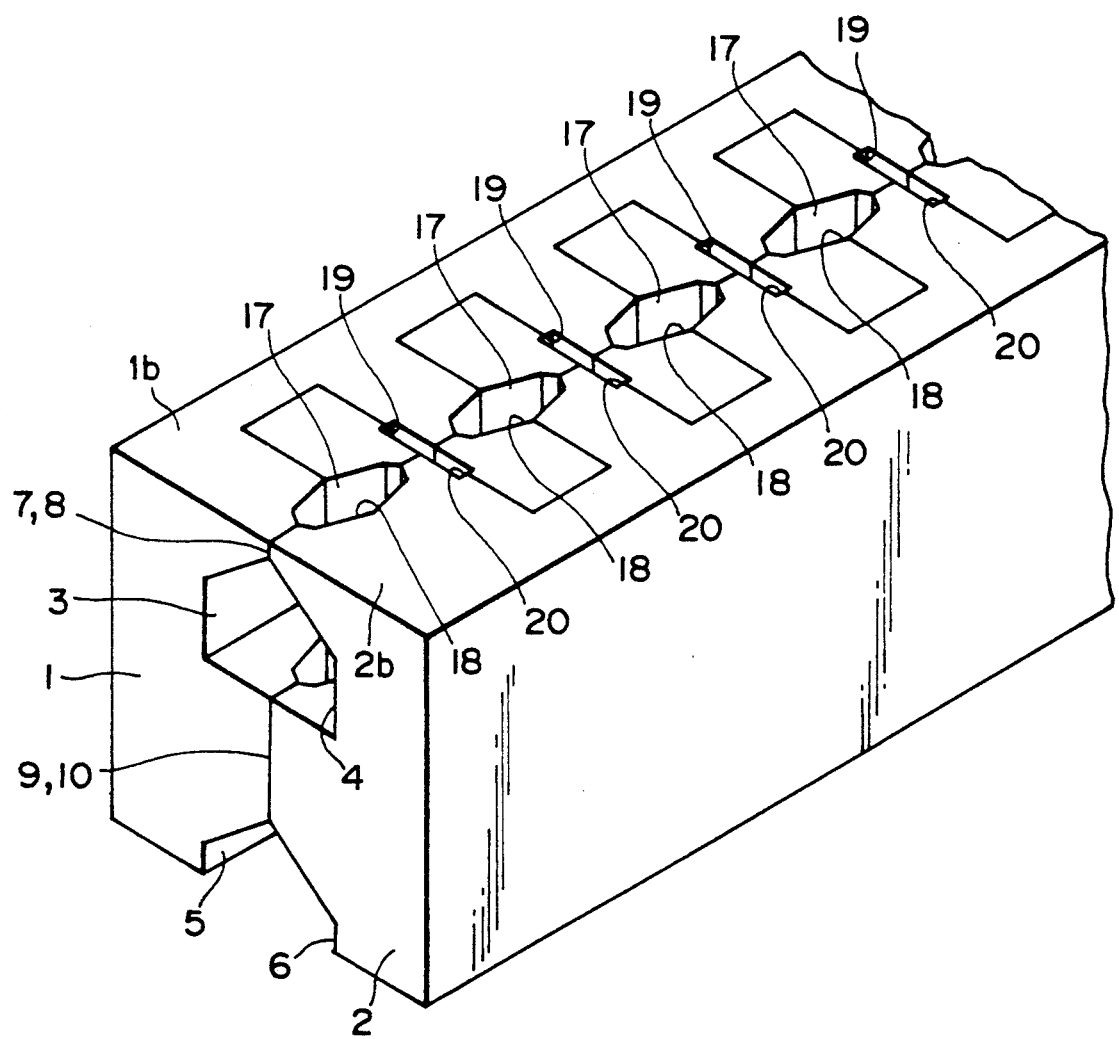

Then, as illustrated in FIG. 6, the two magnetic core blocks 1, 2 are butted to each other with positional alignment of the tracks thereof.

More specifically, the track-width limit grooves 17, 18 and the head-element division slits 19, 20 are positioned opposite to each other, and the front-gap forming surfaces 7, 8 are butted mutually while the back-gap forming surfaces 9, 10 are also butted mutually in a similar manner.

In this stage, it is necessary that a gap film having a predetermined gap length is existent between the front-gap forming surfaces 7, 8. In case the gap film is composed of a welding glass material, a gap spacer corresponding to such gap length is interposed therebetween in the butting step. And when the gap is formed of a thin film, first the front-gap forming surfaces 7, 8 are finished to be specular, then a nonmagnetic material such as $SiO_2$, $Ta_2O_5$, $ZrO_2$, Cr or Be-Cu alloy is deposited on the specular surfaces by the vacuum thin-film forming technique in a manner to obtain a desired gap length, and the butting step is executed.

Subsequently, glass bars (not shown) are inserted into the coil grooves 3, 4 and the glass grooves 5, 6 in the butted magnetic core blocks 1, 2, which are then heated to be welded to each other with the glass.

It is desired that the welding glass be a proper material which is capable of ensuring a sufficiently great joint strength between the magnetic core blocks 1, 2 while minimizing generation of bubbles at the welding time and attaining high reliability with least erosion on the magnetic core blocks 1, 2.

Figure 7:
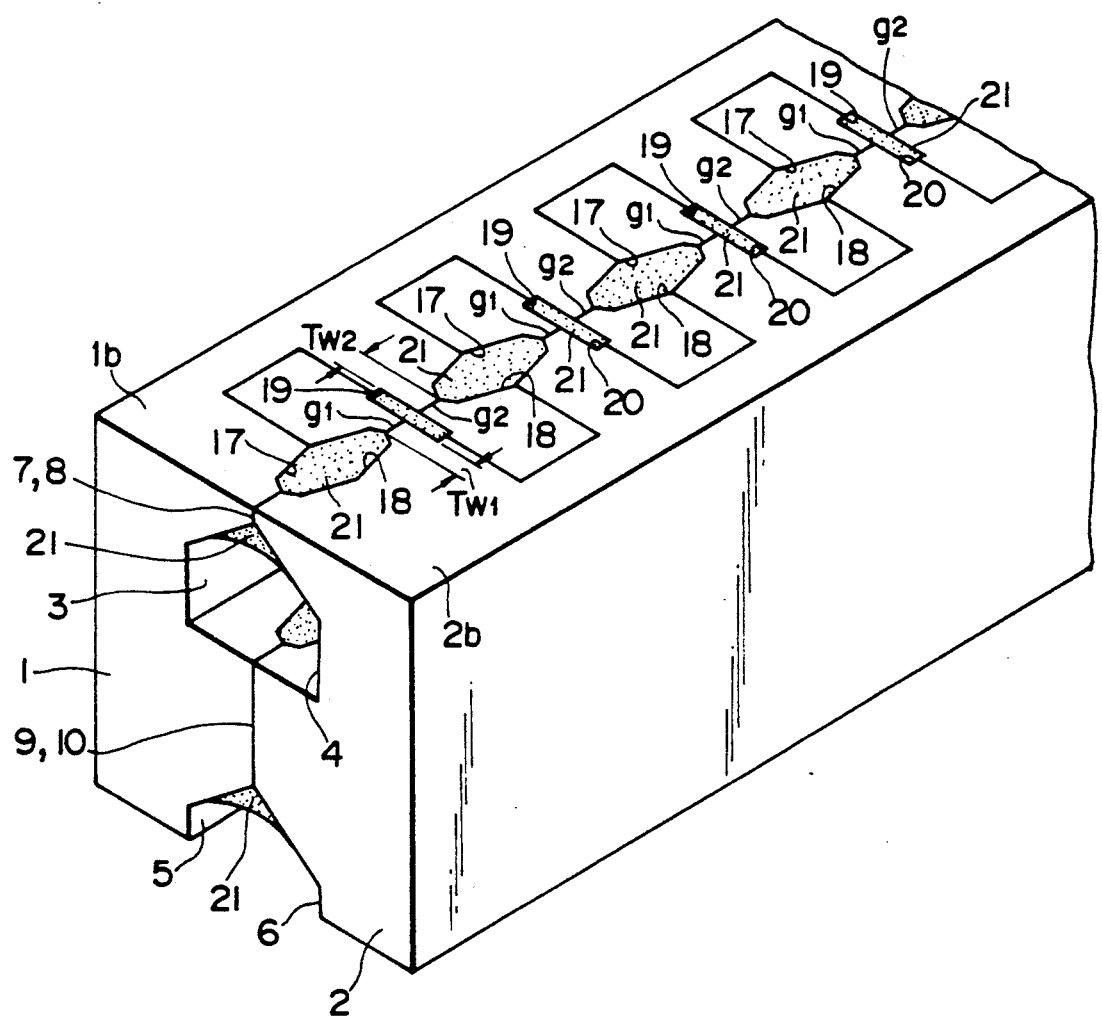

As a result of the above step, as illustrated in FIG. 7, the welding glass 21 is filled between the track-width limit grooves 17, 18; between the head-element division slits 19, 20; between the coil grooves 3, 4; and also between the glass grooves 4, 6 to thereby join the magnetic core blocks 1, 2 integrally to each other. Meanwhile on both sides of the head-element division slits 19, 20, there are formed magnetic gaps g1, g2 having track widths Tw1, Tw2 along the front-gap forming surfaces 7, 8 respectively.

Next, notches 22 are formed in one magnetic core block 2 along the direction of extension of the track-width limit grooves 18 in such a manner as to extend from the lateral surface 2d on the reverse side with respect to the front-gap forming surface 8 and to reach at least the coil grooves 4 adjacently to the head-element division slits 20.

Figure 8:
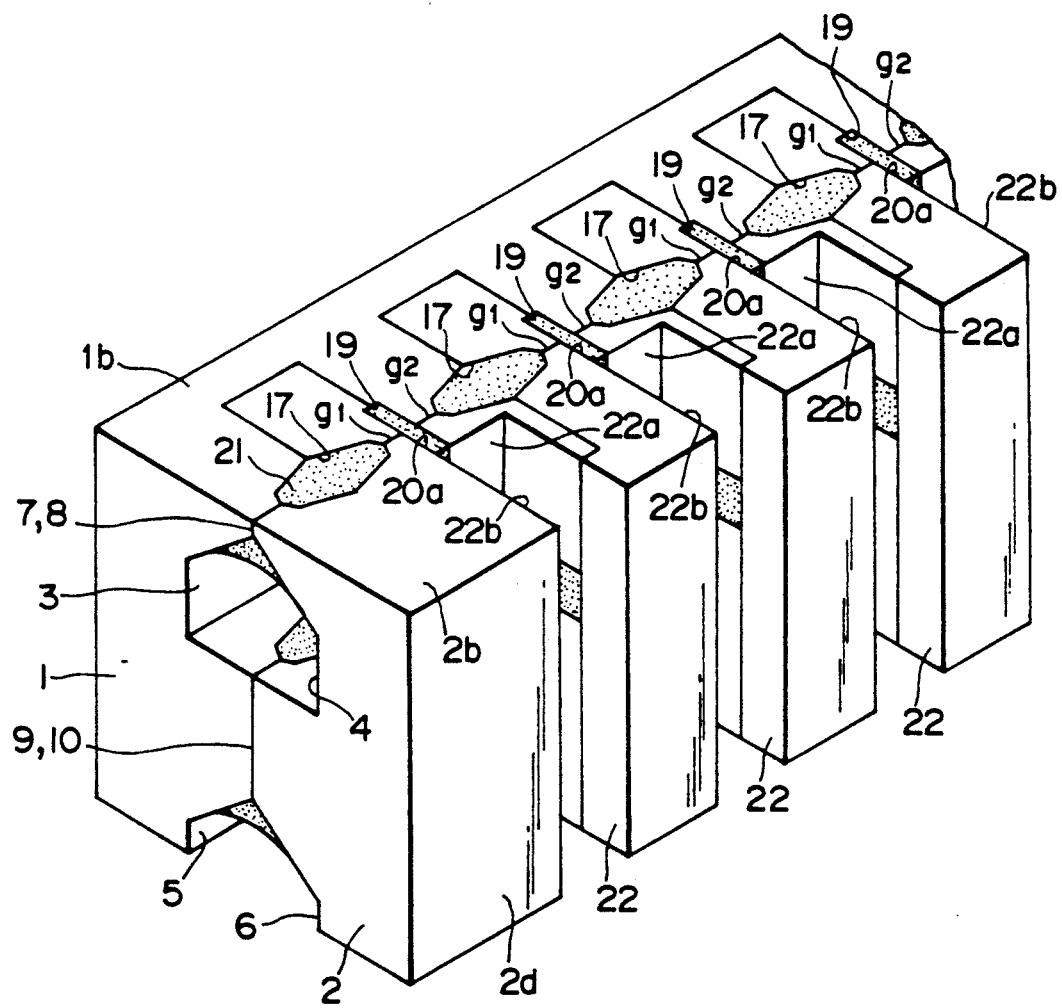

More specifically, as illustrated in FIG. 8, one surface of a disc-shaped rotary grinder for example is positioned at one lateral wall 20a of the head-element division slit 20 proximate to the magnetic gap g1 in a posture substantially orthogonal to the front-gap forming surface 8 from the lateral surace 2d of the magnetic core block 2, and then the grinder is so driven as to cut a notch on the side of the other magnetic gap g2. The rotary grinder is advanced until reaching at least the coil groove 4. In this stage, the width of the notch 22 is set to be greater than the core thickness of one magnetic head element which will be described later.

Consequently the bottom surface 22a of the notch 22 is provided at a position shallower than the bottom of the coil groove 4 with respect to the front-gap forming surface 8. And one lateral surface 22b of the notch 22 is formed to be coincident with one lateral wall 20a of the head-element division slit 20. Therefore no portion of the auxiliary core block 14 is left on one lateral surface 22b of the notch 22.

One lateral surface 22b of the notch 22 need not exactly be coincident with one lateral wall 20a of the head-element division slit 20, and the requisite is met if the surface 22b adjoins the head-element division slit 20. Accordingly the position thereof may be deviated toward the magnetic gap g1.

Figure 9:
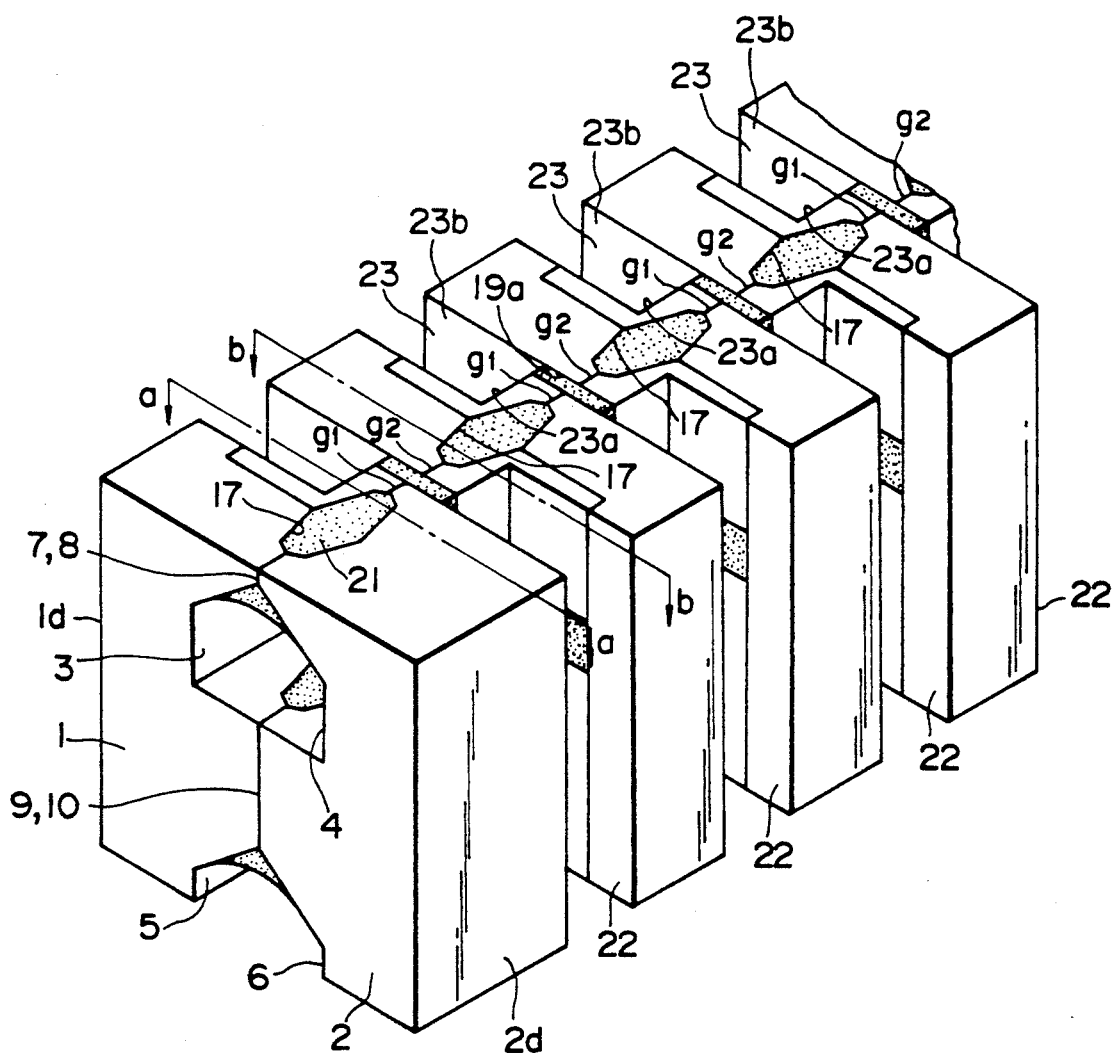

Next, as illustrated in FIG. 9, notches 23 are formed in the other magnetic core block 1 in such a manner as to extend from the lateral surface 1d on the reverse side with respect to the front-gap forming surface and to reach the coil grooves 3 adjacently to the head-element division slits 19.

In this case, one surface of a rotary grinder is positioned at one lateral wall 19a of the head-element division slit 19 proximate to the magnetic gap g2 and then is so driven as to cut a notch on the side of the other magnetic gap g1. Any other conditions are the same as those in the preceding case.

As a result, the bottom surface 23a of the notch 23 is provided at a position shallower than the bottom of the coil groove 3 with respect to the front-gap forming surface 7. And one lateral surface 23b of the notch 23 is formed to be coincident with one lateral wall 19a of the head-element division slit 19.

The notches 22, 23 thus formed in the magnetic core blocks 1, 2 respectively are arrayed in an alternate arrangement transversely to the tracks. In the joined structure constituted of the block portion left between the notches 23 in one magnetic core block 1 and the block portion left between the notches 22 in the other magnetic core block 2, the respective block portions are connected to each other in the track width direction merely with the glass 21 filled into the head-element division slits 19, 20.

Subsequently the two magnetic core blocks 1, 2 are severed at positions corresponding to the notches 22, 23 along the lines a—a and b—b shown in FIG. 9.

Figure 10:
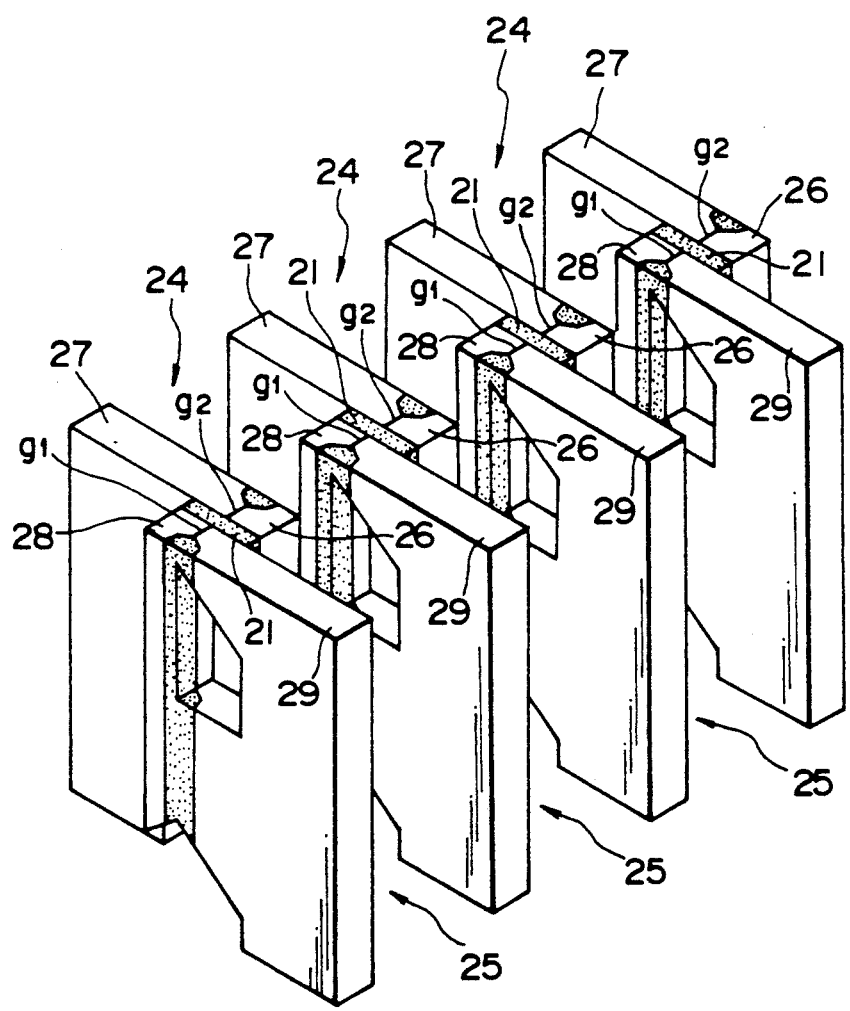

Then, as illustrated in FIG. 10, there are obtained two-channel magnetic heads each constituted of a pair of magnetic head elements 24, 25 joined integrally with the glass 21. Such magnetic head elements 24, 25 comprise first magnetic cores 26, 28 narrow in the direction substantially orthogonal to the magnetic gaps g1, g2 and second magnetic cores 27, 29 wider in comparison therewith. And a closed magnetic path is formed by the magnetic cores 26, 27 and the magnetic cores 28, 29.

Figure 11:
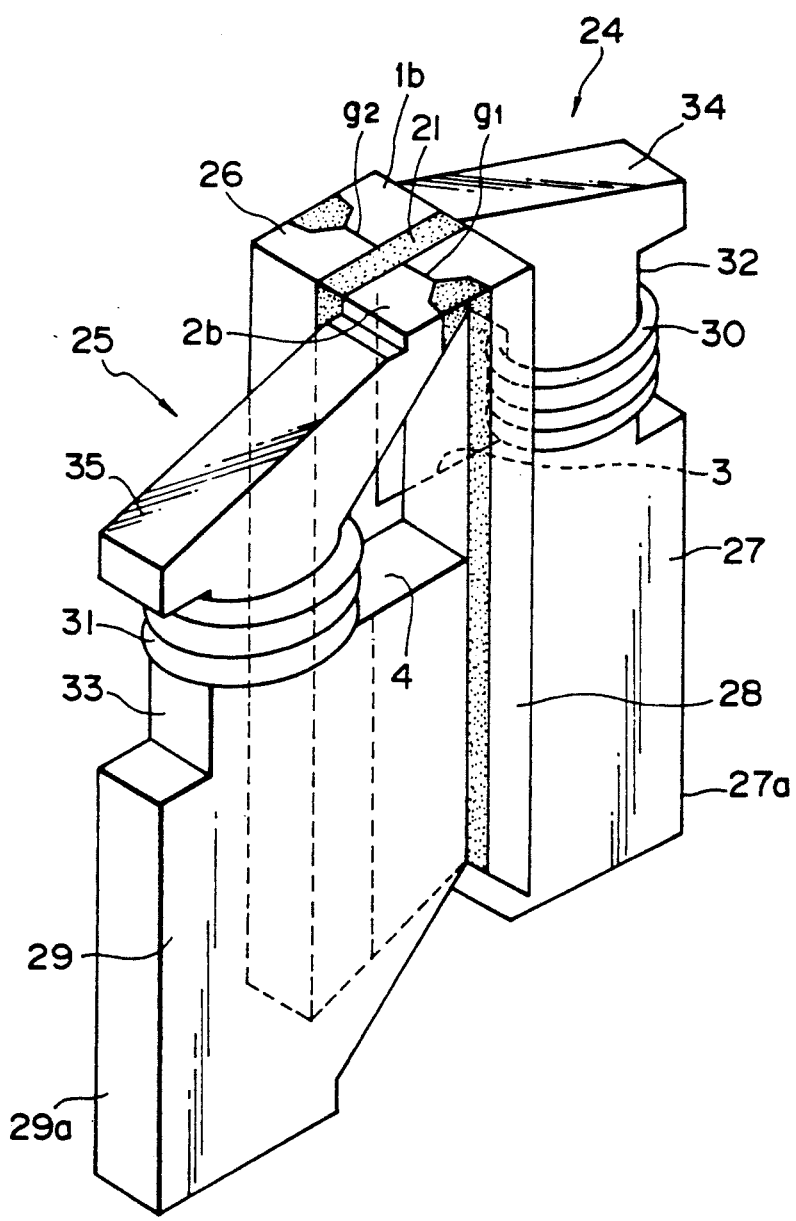

Thereafter in the magnetic head elements 24, 25, auxiliary coil grooves 32, 33 are formed in the lateral surfaces 27a, 29a opposed to the coil grooves 3, 4 so as to facilitate the operation of winding coils 30, 31 around the second magnetic cores 27, 29, as illustrated in FIG. 11. And coils 30, 31 are wound by required numbers of turns through the coil grooves 3, 4 and the auxiliary coil grooves 32, 33.

In the magnetic head elements 24, 25, recording-medium slide surfaces 1b, 2b of the second magnetic cores 27, 29 are partially inclined to form oblique surfaces 34, 35 so as to limit the width of contact with a magnetic recording medium.

Figure 12:
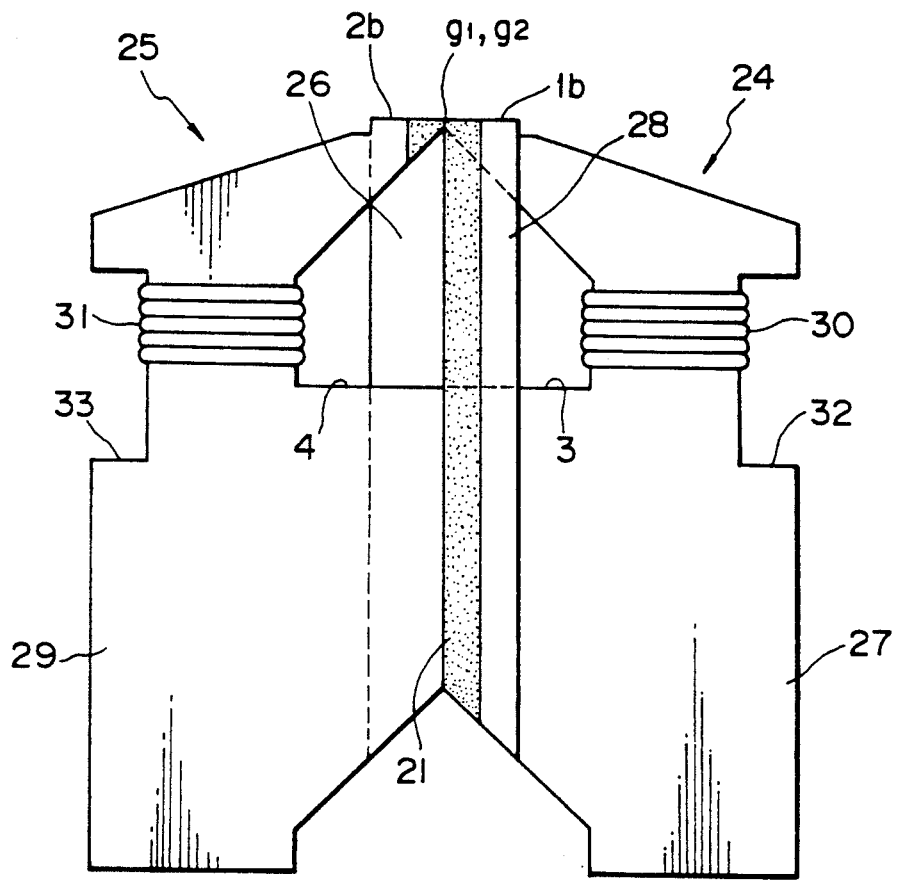
FIG. 12 is an enlarged side view of a magnetic head manufactured by the method of the present invention.
Figure 13:
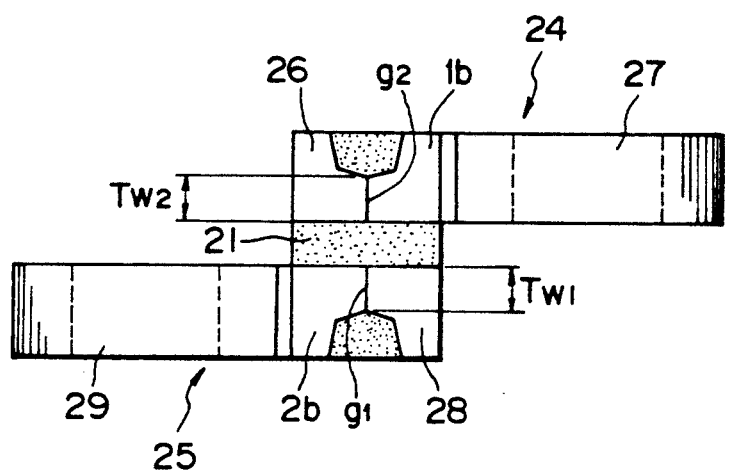
FIG. 13 is an enlarged plan view seen from recording-medium slide surfaces.

In the magnetic head thus produced, the magnetic gaps g1, g2 formed on the recording-medium slide surfaces 1b, 2b of the magnetic head elements 24, 25 are mutually aligned in a straight line with a high precision transversely to the tracks, as illustrated in FIGS. 12 and 13. Such accurate alignment is derived from that the butt surfaces 1a, 2a of the magnetic core blocks 1, 2 directly serve as the front-gap forming surfaces of the magnetic cores 26, 27 and 28, 29. It becomes therefore possible to attain a high-precision in-line arrangement of the magnetic gaps g1, g2 and also to eliminate any loss that may otherwise result from the phase deviation of reproduced signals.

In the magnetic head mentioned, the coil grooves 3, 4 of the magnetic head elements 24, 25 are disposed on the mutually reverse sides with respect to the magnetic gaps g1, g2, and the mutually confronting first magnetic cores 26, 28 are set back to positions where the coil grooves 3, 4 are partially open, thereby ensuring sufficient spaces to wind the coils 30, 31 through the coil grooves 3, 4 to consequently facilitate the coil winding operation. The advantage thus attained is based on the structure where the notches 22, 23 are formed in a manner to reach at least the coil grooves 3, 4 adjacently to the head-element division slits 19, 20 formed in the magnetic core blocks 1, 2. Therefore it is rendered possible to reduce the interval of the magnetic head elements 24, 25 in the track width direction without any restriction relative to the operation of winding the coils 30, 31.

In this magnetic head, the width of the first magnetic cores 26, 28 opposed to the coil grooves 3, 4 is rendered narrow to thereby minimize the areas of the other magnetic head elements 24, 25 opposed to the second magnetic cores 27, 29. Consequently the crosstalk characteristics can be ehhanced in the magnetic head according to this embodiment.

In the present invention, as apparent from the description given hereinabove, a pair of magnetic core blocks are butted to each other and magnetic head elements are so formed that magnetic gaps are defined between the mutually butted surfaces, whereby the magnetic gaps are aligned on a single line. Therefore the in-line precision of the magnetic gaps can be enhanced with an advantage of preventing any phase deviation between the magnetic gaps, hence eliminating any loss that may otherwise result from the phase deviation of recorded and reproduced signals.

Furthermore, according to the method of the present invention, coil grooves are disposed on mutually reverse sides with respect to the magnetic gaps, and the thickness of the magnetic core portions opposed to the coil grooves is set to be smaller than the depth of the coil grooves. Consequently, it becomes possible to ensure sufficient spaces for winding the coils while realizing a narrow track-to-track interval.

Besides the above, in the magnetic head manufactured by the method of the present invention, the crosstalk characteristics can be improved due to the novel structure where two independent magnetic head elements are joined to each other with glass in the direction transverse to the tracks.

Thus, the present invention is capable of providing a satisfactory bulk-type magnetic head wherein a high in-line precision of magnetic gaps and a narrow track structure can be achieved while sufficient coil winding spaces are maintained with further advantages including enhanced crosstalk characteristics.

What is claimed is:

1. A method for manufacture of a magnetic head, comprising the steps of:

forming, in respective butt surfaces of a pair of magnetic core blocks, coil grooves and auxiliary core block fitting grooves substantially orthogonal thereto;

fitting auxiliary core blocks, which constitute one magnetic core of a magnetic head element, into said auxiliary core block fitting grooves and then welding said auxiliary core blocks therein with glass;

forming track-width limit grooves in the respective butt surfaces of said magnetic core blocks substantially orthogonally to said coil grooves, and forming head-element division slits between said track-width limit grooves;

butting said magnetic core blocks to each other with positional alignment of tracks, and then welding said core blocks to each other with glass;

forming notches in said core blocks along the direction of extension of said track-width limit grooves in such a manner as to extend from lateral surfaces of said core blocks on the reverse side with respect to the butt surfaces thereof and to reach at least said coil grooves adjacently to said head-element division slits; and cutting the above structure at the positions of said notches to thereby divide the same into individual magnetic heads.

* * * * *